Oct. 24, 1933.   J. J. DOWLING   1,932,337
ELECTRICAL METHOD OF AND MEANS FOR TESTING MATERIALS
Filed July 30, 1930   4 Sheets-Sheet 1
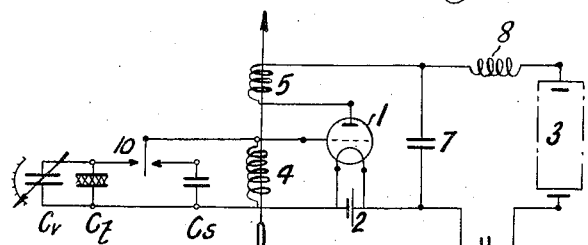
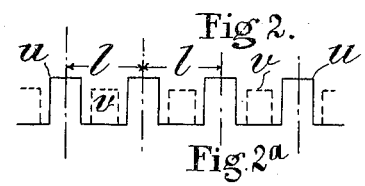
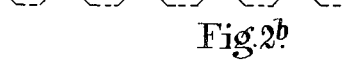
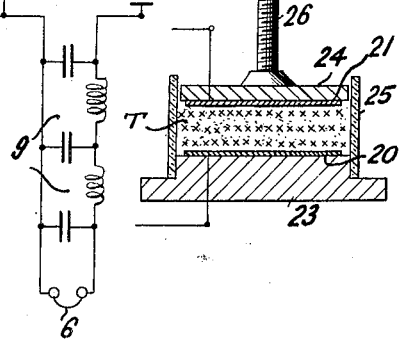
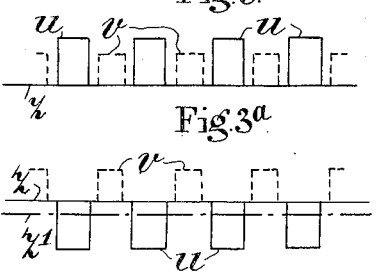
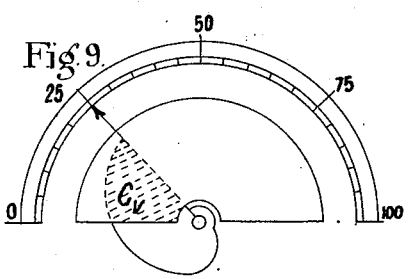
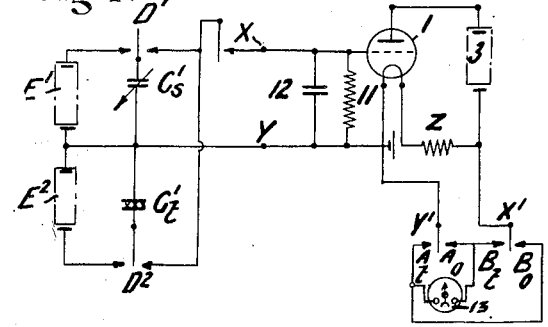

J. J. Dowling
INVENTOR
By: Marks & Clerk
ATTYS.

Oct. 24, 1933.    J. J. DOWLING    1,932,337
ELECTRICAL METHOD OF AND MEANS FOR TESTING MATERIALS
Filed July 30, 1930    4 Sheets-Sheet 4

J. J. Dowling
INVENTOR

By Mauno Klerk
Attys.

Patented Oct. 24, 1933

1,932,337

UNITED STATES PATENT OFFICE 1,932,337

ELECTRICAL METHOD OF AND MEANS FOR TESTING MATERIALS

John Joseph Dowling, Dublin, Ireland, assignor to Kenyon Stuart Grieve Sommerville, London, England, and John Joseph Dowling Application July 30, 1930, Serial No. 471,799 and in Great Britain July 30, 1929

15 Claims. (Cl. 175—183)

As is now well known the presence of moisture in material; the variation of thickness or density of slabs of material; the relative movement of parts of a device such as a seismometer, engine-balancing machine, balance, weighing machine, extensimeter, accelerameter etc., and a number of other effects may produce a change in the capacity of an electrical condenser in sundry ways.

This knowledge has been made use of as the basis of methods of detecting and measuring variations in physical conditions or properties of materials and the like and various arrangements have been proposed in which the condenser is associated with thermionic valve means to enable changes, which ought to be made known, to be ascertained.

Generally the condenser and valve have been used with a battery and a device responsive to current variations such as a galvanometer, but heretofore the arrangements in practice have been complicated due to the necessity for compensating in some way for battery variations etc.

The object of the present invention is to enable the requisite detection and measurement to be effected in a more expeditious and accurate manner than has previously been possible and by devices which are simple, reliable and highly sensitive.

One form of apparatus suitable for carrying out the invention consists in the combination of a device such as a galvanometer or telephone with at least two devices such as condensers or photo electric cells capable, either directly or indirectly, of responding to electrical conditions due either to a common source or to two sources which bear a definite relationship to each other, and in one case, a possible disturbing influence, the various elements being connected in circuit in such a manner that the detection and measurement is not dependent upon the action alone of the device purposely exposed to the possible disturbing influence referred to but upon both devices either simultaneously or successively.

Where an aural investigation and determination of conditions is sufficient for any particular purpose it may suffice to conduct the output current of a three electrode thermionic valve to a telephone, a standard condenser and a condenser whereof the dielectric is, say, vegetable matter (tobacco for instance) undergoing moisture test, being arranged to be alternately connected across part of a radio frequency oscillating circuit associated with the valve, as by means of a contact maker vibrated at audio frequency say 200 to 500 cycles. A variable condenser may be connected in parallel with the test condenser, or the standard condenser may be itself adjustable. The output current of the valve will be a series of impulses which if the two companion condensers or condenser systems are unbalanced will be alternately of different amplitude. The telephone therefore will respond to the mean value of such impulses and may advantageously be included in "a low-pass" filter circuit for audio frequencies of say 200 to 500 cycles and under. When the capacities of the condensers balance, the successive output current impulses will be uniformly equal in value and, as they are applied unidirectionally to the telephone, no sound will be heard in the latter from which it will be obvious that variations in voltage of the battery of the system will not affect telephonic indications. The use of radio frequency oscillations in comparing the capacities of the condensers is preferred because at such high frequencies ($10^5$ to $10^8$ cycles per second) the capacity measurements are quite free from trouble due to conductivities of materials.

An oscillatory valve circuit of the kind referred to may be established by coupling inductively a grid coil and an anode coil each of, say, 100 microhenries inductance and using therewith a tuning capacity of the order of .0001 microfarad. Since the tuning capacity is provided alternately by the standard condenser and the test condenser uniform oscillation is obtainable only when the capacity of the test condenser system is equal to that of the standard condenser system. It is found, however, that a circuit as above described and wherein the capacity is variable from zero to the maximum will, as the capacity is gradually increased, go smoothly into oscillation (thus giving a steadily increasing reading on a galvanometer connected in the anode circuit) and, with still further increase of capacity, come gradually out of oscillation again (with steadily decreasing reading on such galvanometer). There are, therefore, two "working ranges" of capacity values for which there is a reading on the galvanometer corresponding to each value of the condenser capacity. Thus, if the plates of the condenser move, or if different samples of materials are introduced as dielectric between fixed plates in a test condenser the galvanometer will respond accordingly, provided that the limits of the particular working range employed (preferably the range of the lower capacities) are not passed. The galvanometer is arranged to show the mean reading between the anode current when the standard condenser is in circuit and the anode current when the test condenser is in circuit, so that the said mean reading can only be zero when the capacity of the standard condenser system and that of the test condenser system are equal.

A more advantageous method of obtaining the information desired is to employ condensers as referred to and a galvanometer through which an impulse of the valve output current as controlled by one of the condensers is passed through the galvanometer in one direction followed by an impulse as controlled by the other condenser passed in reverse direction through the galvanometer. In this way the galvanometer may be used to indicate the condition continuously, remaining at zero so long as the condenser balance remains. As this balance is disturbed so will there be a galvanometer deflection which can be read or recorded, photographically or in any other suitable way; alternatively however the variable condenser can be altered to bring the galvanometer to zero.

The condenser and galvanometer circuits can be completed and interrupted by electromagnetic relay arrangements operating off an alternating current supply but preferably by the mechanical operation of rotatable cams so shaped as to give the required sequence. In some cases it may be thought necessary or advantageous to open the galvanometer circuit for a longer period than marks the interchange of the condensers so that the middle fractions only of the output current impulses are impressed upon the galvanometer.

As a further modification, two condensers or photoelectric cells as referred to may be employed each adapted to be connected alternately to one or more companion batteries respectively or one photoelectric cell illuminated alternately by two beams of light there being connection to a galvanometer or the like either directly or through a thermicnic valve, the alternate impulses being passed in reverse order through the galvanometer as in the previous example.

In the accompanying drawings which illustrate the invention,

Fig. 1 is a circuit diagram of a testing apparatus embodying an oscillatory valve circuit with input alternately from a test condenser and a standard condenser and output to telephones through a low-pass filter.

Figs. 2, 2$^a$ and 2$^b$ show graphically the conditions prevailing in the output circuit of Fig. 1 while Fig. 3 and 3$^a$ show the modified conditions which would prevail if a galvanometer and reversing switches were substituted for the low pass filter circuit and telephones.

Fig. 4 illustrates a modified arrangement and variants thereof, in which a galvanometer is employed as indicating means.

Fig. 6 is a diagrammatic sectional view illustrating a preferred construction of test condenser, while

Figure 9 is a diagram illustrating a preferred method of constructing a trimming or balancing condenser the function of which is hereinafter further explained.

Figure 5:
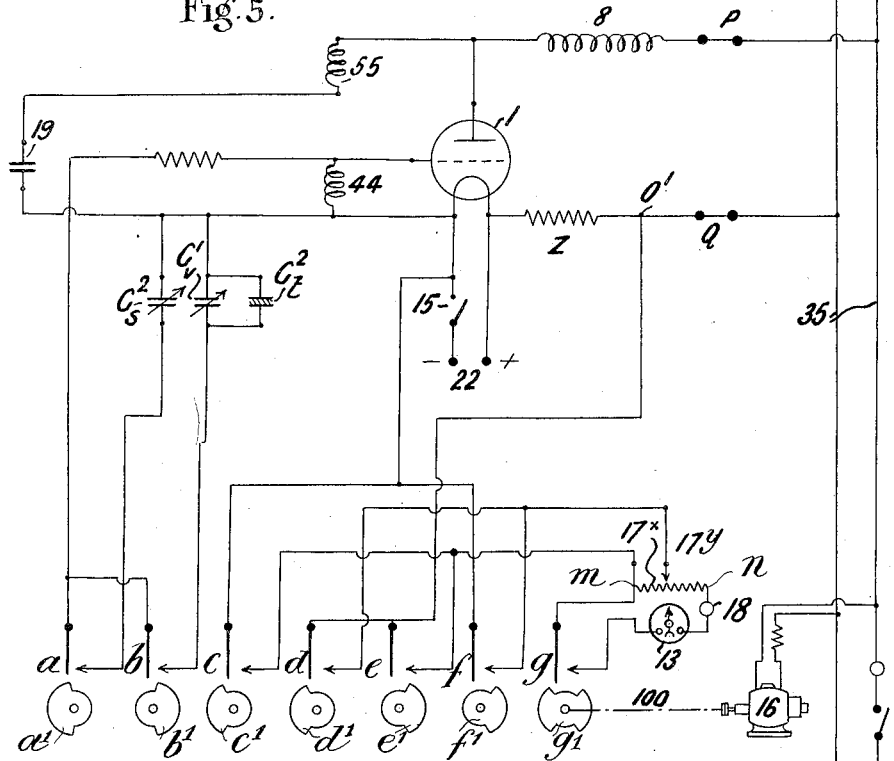
Fig. 5 is a circuit diagram of a preferred form of test apparatus with rotary switching arrangements.

In the arrangement illustrated in Fig. 1 the reference 1 designates a thermionic valve, having the usual source 2 of low tension current for cathode heating and a high tension source 3 for providing anode potential. The grid circuit of this valve includes a coil 4 which is variably coupled to a coil 5 in the anode circuit so that the valve can readily be brought to and maintained in a state of radio frequency oscillation. Preferably the high frequency component of the output is shunted from the telephone circuit, in known manner, by a high frequency by-pass condenser 7, assisted by a series connected high frequency choke winding 8. Reference 9 designates generally, a low-pass filter circuit designed to permit only the audible frequencies to pass to the telephone 6.

Across the grid circuit of the valve 1, in shunt with the grid coil 4 is arranged the system of standard and test condensers whereby the condition or properties of the material under test can be investigated. Numeral 10 designates a vibrating contact maker adapted to be vibrated at a frequency of say, from 200 to 500 cycles per second. This contact maker connects alternately across the grid circuit of the valve, the standard condenser $C_s$, of fixed capacity and the test condenser $C_t$, the capacity of which, assuming constant spacing of its electrode plates, varies in accordance with varying properties of the dielectric material T under test (it may be, for instance, tobacco or other vegetable matter, undergoing a test for variation in moisture content). A measure of the degree of deviation from the normal in any particular sample of material may be provided by shunting the test condenser $C_t$ with a condenser $C_v$ of variable capacity the latter being varied for every abnormal sample of material so as to restore the normal condition of silence in the telephone and the shunt condenser being suitably calibrated to indicate what capacity has had to be added to or taken from the circuit in effecting such restoration. Fig. 2 shows in graphic form the output from the valve in Fig. 1, the loops $u$ shown in full lines being assumed to be the output due to the standard condenser $C_s$ while the smaller loops $v$ represent a smaller output from the valve in the periods when the test condenser $C_t$ is connected in circuit. This is the condition prevailing when difference of capacity exists between the test condenser and the standard condenser. Each set of impulses, $u$ and $v$ may be developed at the rate of, say, 200 per second, so that the time period $l$ in Fig. 2 is one two-hundredth part of a second.

The effect of the low pass filter circuit 9 is to cut out double frequency interruption noises, so that the actual input to the telephones is as shown in Fig. 2$^a$ when the oscillatory circuit is working under the condition assumed in connection with Fig. 2. The frequency of the audible note depends, of course, on the frequency of vibration of the contact breaker 10 in the valve input circuit.

If now the condenser $C_v$ be adjusted so that the combined capacities of $C_v$ and $C_t$ are equal to the capacity of $C_s$ the valve output current will attain one constant level, notwithstanding the action of the contact breaker 10 and, under these circumstances the input current to the telephones will be of unvarying strength, as shown in Fig. 2$^b$. This condition corresponds to silence in the telephones.

If, in place of the low pass filter and telephones there be substituted a galvanometer and commutating switches the circuit can be operated as shown in Figs. 3 and 3$^a$.

Fig. 3 shows the valve output for standard and test condensers as in Fig. 2, the line of zero current being indicated at $z$. The action of the commutating switches, synchronizing with the alternate connection of standard condenser and test condenser in the valve input circuit, causes the input to the galvanometer to be as shown in Fig. 3$^a$. Since the current impulses due to the standard condenser are assumed to be greater than those due to the test condenser the galvanometer will show a mean current indicated by the dot-and-dash line $z^1$. Only when the capacity of the test condenser system is made equal to that of the standard condenser system (by adjusting the condenser $C_v$) will the line $z^1$ coincide with the line $z$ and then the galvanometer will show a true zero reading.

In the arrangement shown in Fig. 4 a standard Condenser $C_s^1$ and a test condenser $C_t^1$ are connected in series while being charged up by the series connected batteries (or equivalent sources of potential) $E^1$ and $E^2$ and in parallel when being discharged into the grid circuit of the valve 1. Charging and discharging of the standard and test condenser is effected by means of the vibratory contact makers $D^1$ and $D^2$, working in synchronous conjunction with a contact breaker at X so that the grid of the valve 1 is connected alternately to the paralleled condensers $C_s^1$ and $C_t^1$. A grid leak 11 maintains the grid near to cathode potential. 12 is a grid reservoir condenser to which the charge from the paralleled condensers $C_s^1$ and $C_t^1$ is imparted.

Numeral 13 designates a galvanometer connected in the output circuit of the valve 1 through vibratory reversing switches $A_t$ $A_o$ and $B_t$ $B_o$ and preferably provided with a zero shunt resistance Z which may have a value of about 1000 ohms and which serves to reduce sparking at the switch contacts. The arrangement is such that the galvanometer contacts operate before the condenser contacts $D^1$ and $D^2$.

Assuming the batteries $E^1$ and $E^2$ to be of equal voltage and the condensers $C_s^1$ and $C_t^1$ to be of equal capacities it will be seen that when these condensers are paralleled and switched into the grid circuit of the valve 1, no charge will be imparted to the grid, so that the galvanometer 13 will give a zero reading. With the standard condenser $C_s^1$ adjusted to or fixed at a given capacity, a lower or higher capacity of the condenser $C_t^1$ (due to variations, for example, in the material T under test therein will result in a greater or less charge being transferred to the grid condenser 12 so that the galvanometer 13 in the valve output circuit will show a corresponding deflection. If the condenser $C_s^1$ be of variable capacity it may be adjusted, for every sample, in the test condenser $C_t^1$, so that the galvanometer gives a zero reading. The condenser $C_s^1$ may be calibrated to indicate the degree of divergence of the test sample from normal condition. If, in this circuit a telephone be substituted for the galvanometer 13 the switches $A_t$, $A_o$ and $B_t$ $B_o$ are omitted so as to obtain telephone input conditions as represented in Figs. 2$^a$ and 2$^b$.

Figure 12:
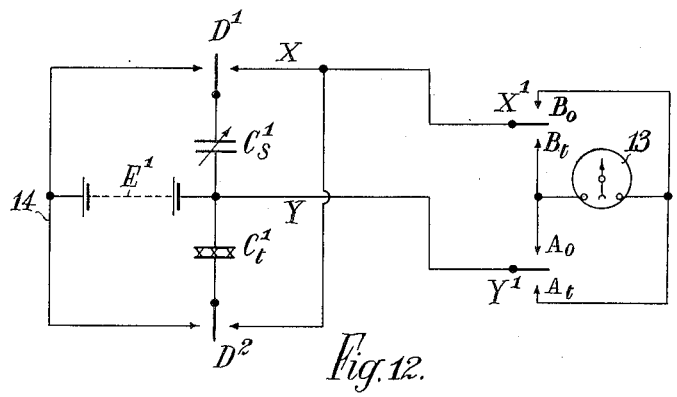
Figure 12 shows a modification of the circuit shown in Figure 4.

The circuit of Figure 4 may be modified in the manner illustrated in Figure 12 by omitting the valve 1 and the circuit elements pertaining thereto and by directly connecting the points $X^1$ $Y^1$ to the points X Y. Furthermore the battery $E^2$ is omitted and a connection as shown by the line 14 is established between the condenser charging contacts at $D^1$ and $D^2$. The vibrating contact tongues at $D^1$ and $D^2$ must then work alternately and that at X is omitted.

A preferred form of test circuit with cam operated switches is illustrated in Fig. 5. The valve 1 is supplied with cathode heating current at 22, a switch 15 being provided in the usual manner for switching the valve on and off. Anode potential for this valve is conveniently derived from direct current or alternating current mains 35 which also supply current for operating a motor 16 to drive the switching cams hereinafter referred to. Either direct or alternating curent may be used but when anode potential has to be derived from alternating current mains a suitable high tension rectifier is installed at P, Q. Reference 8 designates a high frequency choke in the anode circuit of the valve and Z, as in the previous example, is a zero shunt resistance for the galvanometer 13, the operating circuit of which also includes the resistances $17^x$, $17^y$ and a press button switch 18 which allows the galvanometer circuit to be manually interrupted when necessary.

The valve 1 is furnished with an oscillatory circuit comprising the grid coil 44, with which the standard and test condensers can be alternately associated, an anode coil 55 and a blocking condenser 19 in series between said anode coil and the cathode side of the valve.

Reference $C_t^2$ designates the test condenser and $C_s^2$ the standard condenser, shown in this case as a condenser of variable capacity so that the standard against which any particular test is made may be varied to suit the nature and the desired, or expected properties of the material to be tested. Further, in order to obtain a steady galvanometer reading with various test samples a variable trimming condenser $C_v^1$ is provided, in shunt with the condenser $C_t^2$. This trimming condenser may be calibrated to indicate the degree of divergence of any given test sample from the standard chosen for the material under test. Thus, for instance, if the test condenser be used for checking the moisture content in various samples of tobacco, differing moisture contents in samples of the same mass, volume and thickness (measured between plates of $C_t^2$, will give proportionately varying capacities in the test condenser. These variations can be compensated by adjustment of the trimming condenser so that for each sample the capacity of the standard condenser $C_s^2$ is equal to the sum of the capacities of the condensers $C_t^2$ and $C_v^1$ and, by reason of the switching arrangements hereinafter described, a steady reading will then be obtained on the galvanometer 13. Suitable construction of the condenser $C_v^1$, as hereinafter referred to, will permit of its readings being directly proportional to the moisture content of the sample under test.

Alternate switchings of the standard condenser $C_s^2$ and the test condenser $C_t^2$ in shunt across the grid coil 44 is effected by switches $a$ and $b$ opened and closed in alternating sequence by the cams $a^1$ and $b^1$. The active faces of these cams may extend over an arc of about 175 degrees in each case so that at every revolution of the continuously rotated cam driving shaft 100, switch $a$ is closed for nearly one half of a revolution and switch $b$ is closed for nearly the other half of said revolution. During the period of closure of switch $a$, switches $c$ and $d$ are also closed by their cams $c^1$, $d^1$, thus bringing the galvanometer shunt resistance $17^x$ into the anode circuit of the valve. Similarly, and with the same effect, the switches $e$ and $f$ are closed during the period of closure of the switch $b$. Since, however, the active parts of the cams $c^1$, $d^1$, $e^1$ and $f^1$ are only of the order of about 160 angular degrees their associated switches are actually closed for shorter periods of time than the switches $a$ and $b$.

The actual circuit through the galvanometer is completed automatically twice in every revolution of the shaft 100 by the switch $g$ actuated by $g^1$. The active faces of the cam $g^1$ are of less angular extent than those of any of the other cams (they may be for instance, of the order of 150 degrees). By reason of this arrangement the galvanometer receives only the middle portions of the output currents from the valve corresponding to the connection of the condenser $C_t^2$ or the condenser $C_s^2$ in its grid circuit. The coupling between the coils 44 and 55 may be made adjustable.

Figure 10:
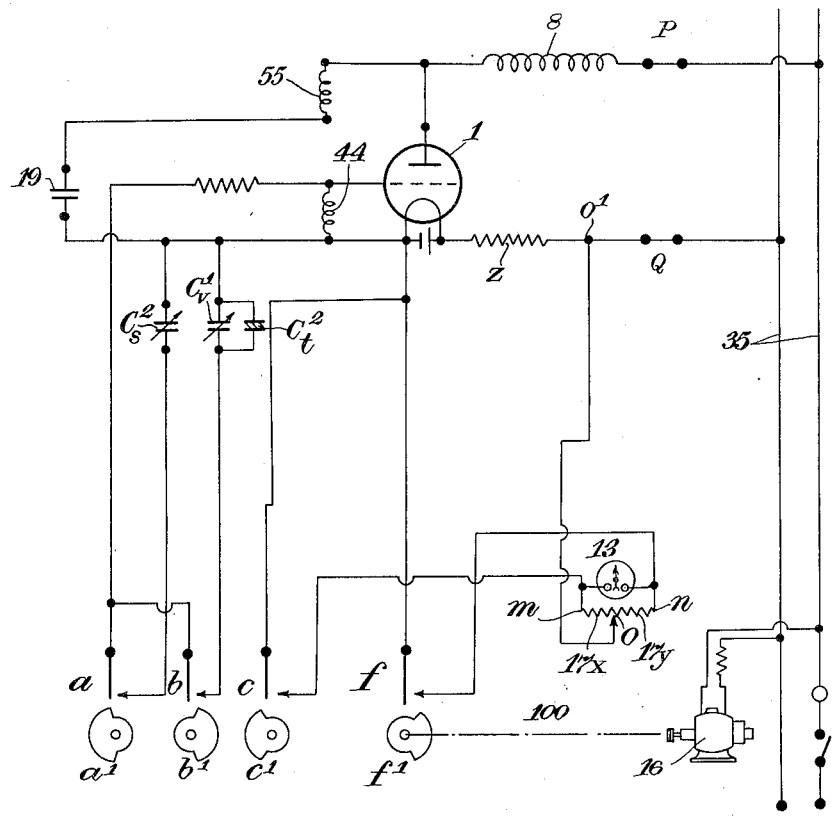
Figure 10 shows a modification of Figure 5 with some of the switches removed.

Switches $d$ and $e$ may be omitted, as shown in Fig. 10, in which case point $m$ on the resistance $17^x$ is connected to switch $c$, point $n$ on the resistance $17^y$ to switch $f$ while the junction point $o$ is connected directly to point $o^1$ in the anode circuit of the valve. Again switches $e$ $f$ may be combined into a single double way switch $h$ as shown in Figure 11.

Figure 11:
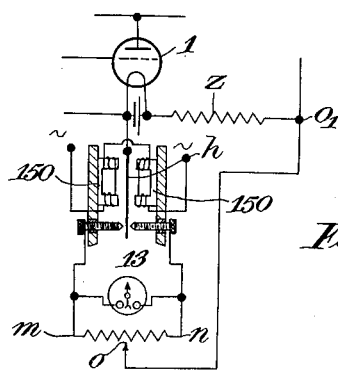
Figure 11 shows the two switches in Figure 10 combined into a single double way switch.

The switches may also be synchronously operated by electromagnetic means 150 instead of by cams as shown in Figure 11. The electromagnets are energized by alternating current which causes the switch $h$ to vibrate thus making contact first with $m$ and then with $n$.

Apparatus as described with reference to Figs. 1, 4 and 5 can be applied to various purposes. Thus the test condenser may form part of an ultramicrometer apparatus for recording changes in length, stress or other properties or conditions, or part of a seismometer apparatus. The galvanometer will give a continuous record.

In apparatus in which the condition or properties of materials are tested by inserting a sample of the material as dielectric between the plates of a condenser it is necessary for the proper comparison of different samples that approximately the same weight of material be taken for each test, that it occupy the same volume and that the thickness of the dielectric layer shall be accurately adjusted for every test. Fig. 6 shows a preferred construction of condenser for this purpose. The electrode plates 20 and 21 are mounted respectively on the base plate 23 and the cover plate 24. The test material T is accommodated in the space between these plates and is confined within the space by a removable wall 25, preferably of a transparent material, such as glass. Any convenient means may be employed for adjusting the distance between the plates 20 and 21 while maintaining parallel relationship between said plates; in the arrangement illustrated the cover plate 24 is furnished with a threaded spindle 26 which can be screwed up and down in a suitable frame (not shown).

In comparative tests in which the capacity of a test condenser with test sample dielectric is brought by means of a trimming condenser to a state of equality with a standard capacity it is very desirable that various grades of deviation of the test sample dielectric from normal should be indicated by proportional readings on the trimming condenser. This object cannot be attained with the simple type of variable condenser having semi-circular moving plates with a concentric spindle.

For the better understanding of this part of the invention let it be assumed that a test condenser is to be used for testing the moisture content of samples of vegetable matter (say, tobacco) in a circuit as in Fig. 1.

The standard condenser $C_s$ must have either a fixed value or, if adjustable, its greatest and smallest values must, in the case of a valve circuit as in Fig. 1, lie within the "working range" of oscillation, as hereinbefore defined. Condenser $C_t$, when filled with the wettest sample must obviously have a capacity slightly less than $C_s$ and when it contains the driest sample its capacity will be much less than that of $C_s$.

Let
$C_s$—a fixed standard capacity of $C_s$
$C_T$—capacity of $C_t$ with any given list sample as dielectric and
$C_v$—capacity to which $C_v$ must be adjusted to secure balance (as indicated by silence in telephones or zero galvanometer reading.
Then, at balance;

$$C_S - C_T = C_V$$

As the samples get wetter $C_V$ diminishes.

If for the trimming condenser a condenser with semicircular and concentrically mounted plates were used the calibration curve would be such that, if the condenser scale were marked in percentages of moisture content the scale divisions would be very crowded at low percentages and wide apart at high percentages.

What is required for practical convenience is a scale with the moisture percentages equally spaced thereon.

When using a test condenser as previously described this relationship could be obtained in simple fashion by arranging a rotary plate of special shape working between two fixed semi-circular plates, as indicated diagrammatically in Fig. 9, in which the capacity $C_V$ corresponds to the area of overlap of the fixed and moving plates.

Figure 7:
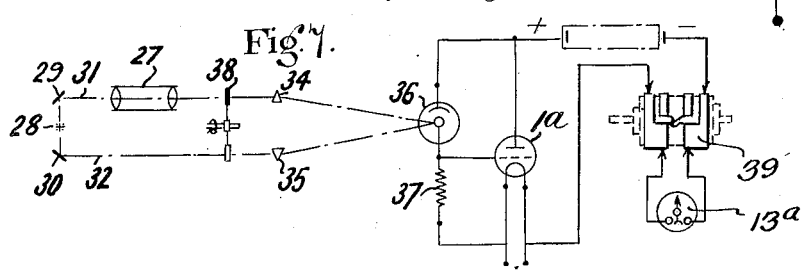
Figs. 7 and 8 are diagrams illustrating test apparatus embodying photoelectric cells and applied to the testing of translucent or opalescent media.

Fig. 7 shows an arrangement in which a photoelectric cell is used in conjunction with a valve circuit for the testing of an opalescent medium indicated at 27. 28 is a light source and 29, 30 are mirrors whereby light from said source is reflected along two parallel paths 31 and 32 to the refracting prisms 34 and 35 which direct both beams of light on to the photoelectric cell 36 connected between the anode and grid of the valve $1^a$. 37 is a grid leak for said valve.

A rotating shutter 38 admits light alternately to the prism 34 and to the prism 35 the former path passing through the medium 27 and the latter path being unobstructed. In the anode circuit of the valve $1^a$ is a commutator 39 which works in synchronism with the shutter 38 to reverse the current through the galvanometer $13^a$ at every half revolution of said shutter. Thus the effect on the galvanometer of direct illumination of the cell 36 and the effect due to indirect illumination (through the medium 27) are opposed and the resultant deflection of the galvanometer is a measure of the degree of opacity of the medium under test.

Figure 8:
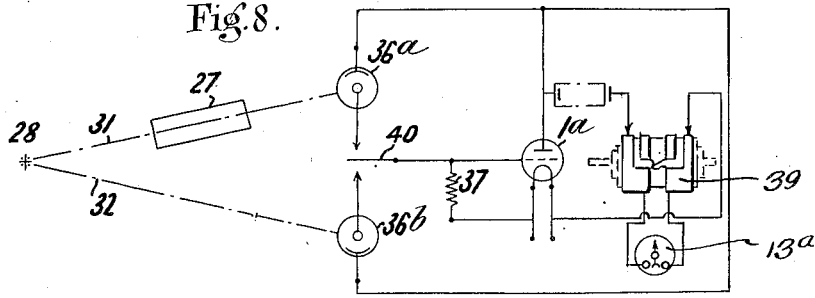
Figure 13:
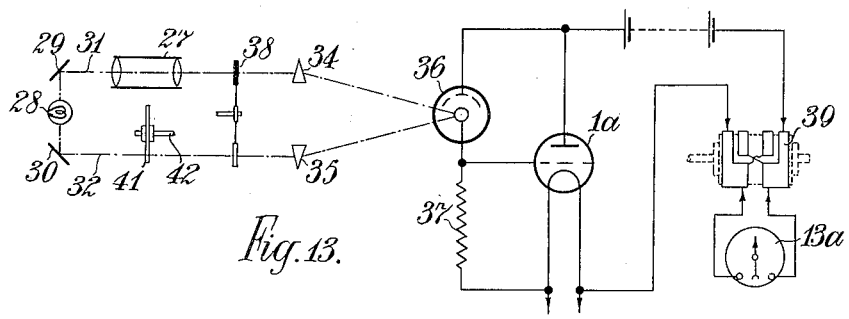
Figure 13 illustrates a modification of the arrangement shown in Figure 7.
Figure 14:
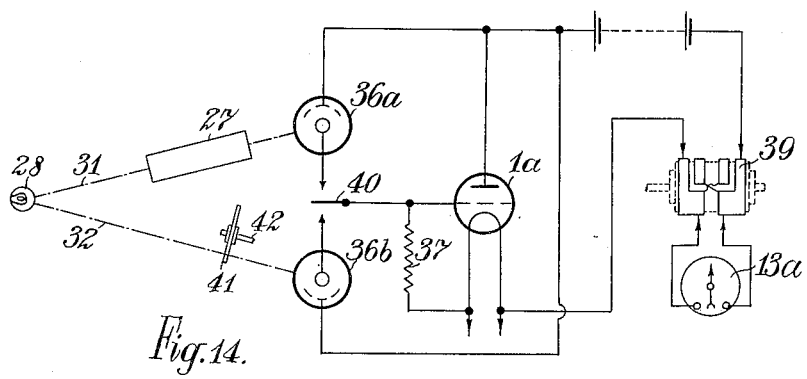
Figure 14 is a corresponding modification of the arrangement shown in Figure 8.

In the modified circuit shown in Fig. 8 the two beams of light 31 and 32 impinge continuously on separate photoelectric cells $36^a$, $36^b$ which are alternately connected in circuit by the vibratory contact breaker 40. The other elements of this circuit are substantially the same as in Fig. 7, with the exception that the revolving shutter and prisms are omitted. Figures 13 and 14 show respectively an alternative and in many cases preferable way of operating apparatus as shown in Fig. 7 or Fig. 8 depends on placing an obstructing body 41 of variable density in the light path 32 and varying the amount of light reaching the photoelectric cell (36ª, or 36ᵇ) by that path until a zero reading is obtained on the galvanometer. The degree of opacity of the obstruction thus artificially interposed in the path 32 is then a measure of the opacity of the test body 27 to the particular light used for the test. The adjustable light obstructing body consists of a disk-like member 41 this member being rotatable about an axis 42 and possessing graduated degrees of opacity, so that rotation of the disk through a given number of degrees corresponds to a definite increase of opacity.

What I claim is:—

1. A method of detecting and measuring physical conditions and properties of materials comprising passing the output current of a thermionic tube circuit as controlled by electrical conditions influenced by the material to be tested through indicating means in one direction and passing in the reverse direction through the said indicating means the output current of the tube circuit controlled by a known electrical condition, said currents following one another in rapid succession.

2. A method of detecting and measuring physical conditions and properties of materials comprising alternately connecting two capacities to the grid of a three electrode thermionic tube, the rapidity of connection being within the audio frequency range, and indicating the variation in the output current of the tube.

3. A method of detecting and measuring physical conditions and properties of materials comprising connecting alternately in succession a test condenser in an oscillatory circuit the dielectric properties of which are influenced by the material to be tested, and a standard condenser having known characteristics which are independent of the material to be tested, and alternately passing the anode currents influenced thereby in opposite direction through indicating means.

4. Means for detecting and measuring physical conditions and properties of materials comprising a thermionic tube oscillating circuit, indicating means in the output circuit of the tube, means controlled by the material to be tested for influencing the output current, means controlled by known electrical conditions for influencing said output current, and means for alternately passing in opposite directions said influenced currents.

5. Means for detecting and measuring physical conditions and properties of materials comprising a thermionic tube oscillating circuit, indicating means in the output circuit of said tube, means controlled by the unknown conditions of the material to be tested, means controlled by known conditions, means for connecting said known and unknown controlled means alternately in the circuit to influence said output current, and means for alternately passing in opposite directions said influenced currents.

6. Means for detecting and measuring physical conditions and properties of materials comprising a thermionic tube oscillatory circuit, means influenced by the dielectric properties of the material to be tested, means having known properties, vibrating means alternately connecting said first and said second means into the grid circuit of said tube, and means in the anode circuit of said tube for indicating conditions.

7. Means for detecting and measuring physical conditions and properties of materials comprising a thermionic tube oscillating circuit, means having electrical characteristics dependent upon said material to be tested, means having known electrical characteristics independent of said material, vibrating means alternately connecting said first and second mentioned means into said grid circuit and detecting and measuring means in the anode circuit of said tube.

8. Means for detecting and measuring physical conditions and properties of materials comprising a thermionic tube oscillating circuit, a condenser, material to be tested located between the plates of said condenser, a condenser of known capacity, vibrating means adapted to connect said condensers in the grid circuit of said tube, and detecting and measuring means in the anode circuit of said tube.

9. Means for detecting and measuring physical conditions and properties of materials comprising a thermionic tube oscillating circuit, an indicating device in the anode circuit of said tube, a standard condenser, a test condenser the dielectric of which consists of the material to be tested, means for connecting said condensers in the oscillatory circuit alternately in rapid succession, and means for establishing a state of equilibrium when the standard condenser is in circuit and the test condenser is in circuit.

10. Means for detecting and measuring physical conditions and properties of materials comprising a thermionic tube oscillating circuit, a detecting device, a standard condenser, a test condenser the dielectric of which consists of the material to be tested, a condenser in parallel with said test condenser, means for alternately connecting said condensers in the oscillatory circuit, and means for alternately reversing the current in the anode circuit through the detecting means.

11. Means for detecting and measuring physical conditions and properties of materials comprising a thermionic tube oscillating circuit, an indicating device in the anode circuit of said tube, a standard condenser, a test condenser the dielectric of which consists of the material to be tested, means for connecting said condensers in the oscillatory circuit alternately in rapid succession, indicating means in the output circuit of said tube and means for reversing alternately in rapid succession the current through said indicating means.

12. Means for detecting and measuring physical conditions and properties of materials comprising a thermionic tube oscillating circuit, means sensitive to light rays controlling the grid of said oscillating valve, a source of light, means for alternately directing the light rays onto the sensitive means through the material to be tested and through a known means, and an indicating device in the output circuit of the valve.

13. Means for detecting and measuring physical conditions and properties of materials comprising a thermionic tube oscillating circuit, a photo electric cell, a source of light, means for passing rays from said source of light through said material to be tested to the photo electric cell, a second source of light, means for passing rays from said second source through known means to said photo electric cell, means for passing alternately in rapid succession the days from the two sources of light, indicating means in the output circuit of the said tube, and means for rapidly reversing the current through said indicating means.

14. Means for detecting and measuring physical conditions and properties of materials comprising a thermionic tube oscillating circuit, a source of light, a photo electric cell receiving rays from said source after passing through the material to be tested, a second photo electric cell receiving rays from said source after passing through a known medium, means for alternately connecting in rapid succession said photo electric cells in the grid circuit of said tube, indicating means in the output circuit of said tube, and means for rapidly reversing the current through said indicating means.

15. A method of detecting and measuring physical conditions and properties of materials comprising alternately connecting in an oscillatory circuit a condenser, the capacity of which is influenced by the material to be tested, and a condenser of known capacity, passing the currents in the anode circuit in alternate succession to the detecting means, varying the capacity of said known condenser until no indication is shown upon the detecting means and measuring the properties by reading the alteration of capacity of the known condenser.

JOHN JOSEPH DOWLING.